(12) United States Patent (10) Patent No.: US 8,165,739 B2
Matsumoto (45) Date of Patent: Apr. 24, 2012

(54) MALFUNCTION DIAGNOSIS SYSTEM AND MALFUNCTION DIAGNOSIS METHOD FOR ELECTRIC VEHICLE ON-BOARD DEVICE

(75) Inventor: Takuya Matsumoto, Nishikamo-gun (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 218 days.

(21) Appl. No.: 12/476,412

(22) Filed: Jun. 2, 2009

(65) Prior Publication Data

US 2009/0299561 A1 Dec. 3, 2009

(30) Foreign Application Priority Data

Jun. 2, 2008 (JP) ................................. 2008-144509

(51) Int. Cl.
*G05D 3/00* (2006.01)
*B60W 10/24* (2006.01)
(52) U.S. Cl. ...................................... 701/22; 180/65.29
(58) Field of Classification Search .................. 701/22, 701/81; 180/65.21, 65.1, 407, 412, 415, 180/422, 443, 174–179, 202, 6.28, 6.5, 214.216, 180/218, 242, 279, 53.5, 60; 280/735, 707, 280/422; 340/428
See application file for complete search history.

(56) References Cited

U.S. PATENT DOCUMENTS

2005/0187681 A1* 8/2005 Suzuki et al. .................. 701/29
2008/0067972 A1* 3/2008 Takami et al. ................ 320/103
2009/0112395 A1* 4/2009 Prokhorov ..................... 701/33

FOREIGN PATENT DOCUMENTS

| JP | 405197408 | * | 8/1993 |
| JP | 11178228 | | 7/1999 |
| JP | 2003009312 A | | 1/2003 |
| JP | 2004266937 | | 9/2004 |
| JP | 2007230398 | | 9/2007 |
| JP | 2008043189 A | | 2/2008 |

* cited by examiner

*Primary Examiner* — James Trammell
*Assistant Examiner* — Muhammad Shafi
(74) *Attorney, Agent, or Firm* — Gifford, Krass, Sprinkle, Anderson & Citkowski, P.C.

(57) ABSTRACT

A malfunction diagnosis system includes: a malfunction diagnosis section that performs a malfunction diagnosis for an on-board device of an electric vehicle when supplied with electric power from either an electric storage section or an external power source; a malfunction diagnosis request section that requests the malfunction diagnosis section to carry out malfunction diagnosis; an external power source connector that supplies electric power from the external power source; and an external power source connection determination section that determines whether the external power source connector is connected to the external power source. The malfunction diagnosis request section changes at least either the number of times that the malfunction diagnosis section is requested to carry out malfunction diagnosis or the period of time the malfunction diagnosis section is requested to carry out malfunction diagnosis depending whether the external power source connector is connected to the external power source.

6 Claims, 6 Drawing Sheets

MALFUNCTION DIAGNOSIS SYSTEM AND MALFUNCTION DIAGNOSIS METHOD FOR ELECTRIC VEHICLE ON-BOARD DEVICE

INCORPORATION BY REFERENCE

The disclosure of Japanese Patent Application No. 2008-144509 filed on Jun. 2, 2008 including the specification, drawings and abstract is incorporated herein by reference in its entirety.

BACKGROUND OF THE INVENTION

1. Field of the Invention

The present invention relates to a malfunction diagnosis system for an electric vehicle on-board device that includes a malfunction diagnosis section that diagnoses whether the electric vehicle on-board device has a malfunction when supplied with electric power from at least one of an electric storage section or an external power source, and a malfunction diagnosis method therefor.

2. Description of the Related Art

In general, it is contemplated diagnosing whether a malfunction has occurred in a device mounted on an electric vehicle equipped with a traction motor, such as an electric car or a hybrid vehicle, is performed after the ignition switch has been turned off. One example of such a device is mounted on a hybrid vehicle in which drive wheels are driven using at least one of an engine and a motor as a driving source, is an evaporative emission control device that prevents emission of evaporation gas, such as fuel vapor. The function of an evaporative emission control device is to prevent emission of fuel vapor from a fuel tank or the like into the atmosphere, and one typical example of such an evaporative emission control device is a charcoal canister, which has a canister containing activated carbon to adsorb evaporation gas (fuel vapor) from the fuel tank or the like, and an exhaust pipe connected to an intake pipe and the canister so that the fuel vapor is drawn from the canister into the intake pipe by negative pressure in the intake pipe created by intake air, and the fuel vapor is burned in the cylinders of the engine when the engine is operating.

When such an evaporative emission control device is used, the diagnosis of whether a malfunction has occurred, such as a hole that may lead to gas leakage from the pipe connecting the fuel tank and the canister and the exhaust pipe, may be performed with a diagnosis device when the engine is stopped after the ignition switch has been turned off. In this case, to diagnose whether there is a malfunction after the ignition switch has been turned off, the electric power necessary to perform the diagnosis may be supplied to the diagnosis device from a low-voltage secondary battery for auxiliary devices.

Japanese Patent Application Publication No. 2004-266937 (JP-A-2004-266937) describes a battery control device that periodically performs self-diagnosis on an auxiliary secondary battery when the ignition key is turned off, and the device has a microprocessor for diagnosing whether a malfunction has occurred in the auxiliary secondary battery. The malfunction self-diagnosis is performed only once if the result of malfunction diagnosis is the same as the previous result and the determination for self-diagnosis is performed a plurality of times if the result of malfunction diagnosis differs from the previous result. It is described that, with this configuration, the determination for self-diagnosis is performed only once to reduce the current consumption if the result of malfunction detection is the same as the previous result.

If malfunction diagnosis is performed on the evaporative emission control device in an electric vehicle when the vehicle is not driven as described above, the diagnosis device is supplied with electric power from a low-voltage secondary battery for auxiliary devices but the electric power which can be used to operate the diagnosis device is limited because the low-voltage secondary battery is not charged from a power generator. Thus, if malfunction diagnosis is made frequently or for prolonged periods when the diagnosis device is used, the amount of charge in the secondary battery may be excessively decreased, that is, a dead battery may occur. On the other hand, for higher accuracy of malfunction diagnosis, it is preferred that the malfunction diagnosis is made frequently or for prolonged periods.

In recent years, when an electric vehicle is a hybrid vehicle, what is called a "plug-in hybrid vehicle" is contemplated which has a connection unit connectable to an external commercial power source so that a low-voltage secondary battery or a high-voltage secondary battery as a power source for a traction motor may be charged from the commercial power source while the vehicle is not driven. In such a plug-in vehicle, the amount of charge in the low-voltage secondary battery does not become too low when it is charged from an external commercial power source, and the diagnosis device may be supplied with electric power, not through the low-voltage secondary battery, but directly from a commercial power source.

Examples of an on-board device which is mounted on an electric vehicle and on which malfunction diagnosis should be made while the vehicle is not driven other than the evaporative emission control device include engine coolant cooling system and battery control device for batteries including secondary batteries. In any case, when diagnosis is made as to whether there is a malfunction in an on-board device, it is necessary to increase the accuracy of the malfunction diagnosis on the on-board device and prevent the amount of charge in an electric storage section which supplies electric power to the malfunction diagnosis device from becoming excessively low. The battery control device described in JP-A-2004-266937 may still be improved in this respect.

SUMMARY OF THE INVENTION

The present invention provides a malfunction diagnosis system for an electric vehicle on-board device which determines whether a malfunction has occurred in the on-board device with high accuracy and prevents the amount of charge in an electric storage section, which supplies electric power to the malfunction diagnosis device, from becoming excessively low, and a malfunction diagnosis method therefor.

A malfunction diagnosis system for an electric vehicle on-board device according to a first aspect of the present invention includes: a malfunction diagnosis section that performs diagnosis to determine whether a malfunction has occurred in the electric vehicle on-board device when the malfunction diagnosis section is supplied with electric power from at least one of an electric storage section and an external power source; a malfunction diagnosis request section that requests the malfunction diagnosis section to carry out malfunction diagnosis; an external power source connector that supplies electric power from the external power source, which supplies electric power from outside, to the malfunction diagnosis section and the malfunction diagnosis request section when the external power source connector is connected to the external power source; and an external power source connection determination section that determines whether the external power source connector is connected to the external power source; wherein the malfunction diagnosis request section changes at least one of the number of times that the malfunction diagnosis request section requests the malfunction diagnosis section to carry out malfunction diagnosis and the period of time for which the malfunction diagnosis request section requests the malfunction diagnosis section to carry out malfunction diagnosis depending on whether the external power source connection determination section had determined that the external power source connector is connected to the external power source.

According to the malfunction diagnosis system for an electric vehicle on-board device of the first aspect, the number of times and/or the period of time for which the malfunction diagnosis request section requests the malfunction diagnosis section to carry out malfunction diagnosis when it is determined that the external power source connector and the external power source are connected is greater than the number of times and/or the period of time for which the malfunction diagnosis request section requests the malfunction diagnosis section to carry out malfunction diagnosis when it is determined that the external power source connector and the external power source are not connected, for example. Thus, the number of times and/or the period of time for which the malfunction diagnosis is carried out are increased so that the accuracy of malfunction diagnosis can be increased when the external power source connector and the external power source are connected, and the number of times and/or the period of time for which the malfunction diagnosis is carried out are decreased so that the amount of charge in the electric storage section, which supplies electric power to the malfunction diagnosis section, can be prevented from excessively decreasing when the external power source connector and the external power source are not connected. Therefore, it is possible to prevent the amount of charge in the electric storage section from decreasing excessively and to increase the accuracy of malfunction diagnosis on the on-board device.

A malfunction diagnosis method for an electric vehicle on-board device according to a second aspect of the present invention is a malfunction diagnosis method for an electric vehicle on-board device used to perform diagnosis to determine whether a malfunction has occurred in an electric vehicle on-board device using the malfunction diagnosis system for an electric vehicle on-board device according to the first aspect of the present invention. The method includes: an external power source connection determination process in which the external power source connection determination section determines whether the external power source connector is connected to the external power source; and a malfunction diagnosis process in which the malfunction diagnosis request section changes at least one of the number of times that the malfunction diagnosis request section requests the malfunction diagnosis section to carry out malfunction diagnosis and the period of time for which the malfunction diagnosis request section requests the malfunction diagnosis section to carry out malfunction diagnosis depending whether the external power source connection determination section determines that the external power source connector is connected to the external power source, and the malfunction diagnosis section carries out diagnosis to determine whether the malfunction has occurred in the electric vehicle on-board device according to the request.

A malfunction diagnosis method for an electric vehicle on-board device according to a third aspect of the present invention includes: diagnosing whether a malfunction has occurred in the electric vehicle on-board device using electric power that is supplied from at least one of an electric storage section and an external power source which supplies electric power from outside; using the electric power supplied from the external power source for the malfunction diagnosis if the external power source is connected; determining whether the external power source connector is connected to the external power source; and changing at least one of the number of times that malfunction diagnosis is carried out and the period of time for which malfunction diagnosis is carried out depending on whether the connection state has determined that the external power source connector is connected to the external power source.

BRIEF DESCRIPTION OF THE DRAWINGS

The foregoing and/or further features and advantages of the invention will become more apparent from the following description of example embodiments with reference to the accompanying drawings, in which like numerals are used to represent like elements and wherein.

DETAILED DESCRIPTION OF EMBODIMENTS

Figure 1:
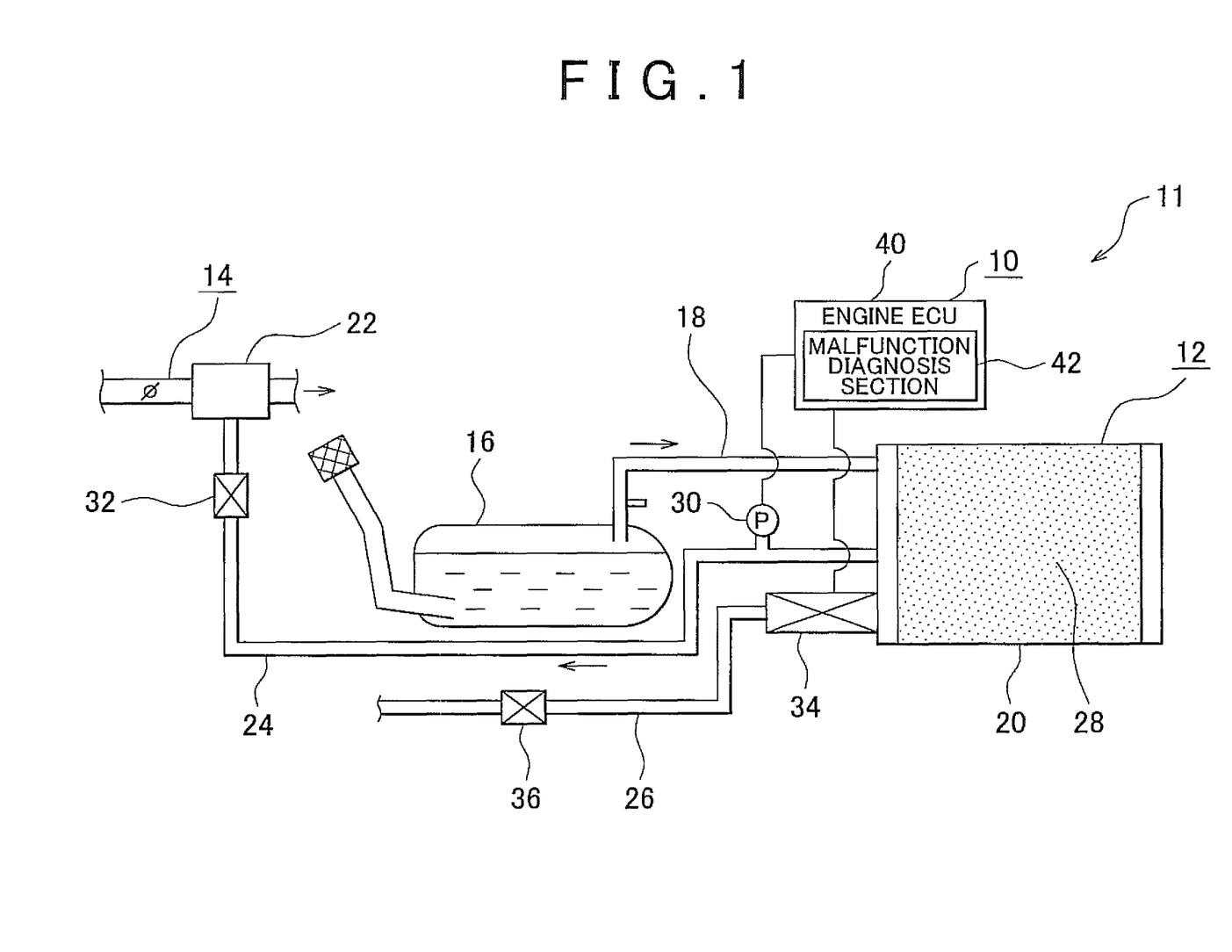
FIG. 1 is a schematic view of an evaporative emission control device as an on-board device for which a malfunction diagnosis system according to an embodiment of the present invention performs malfunction diagnosis.
Figure 2:
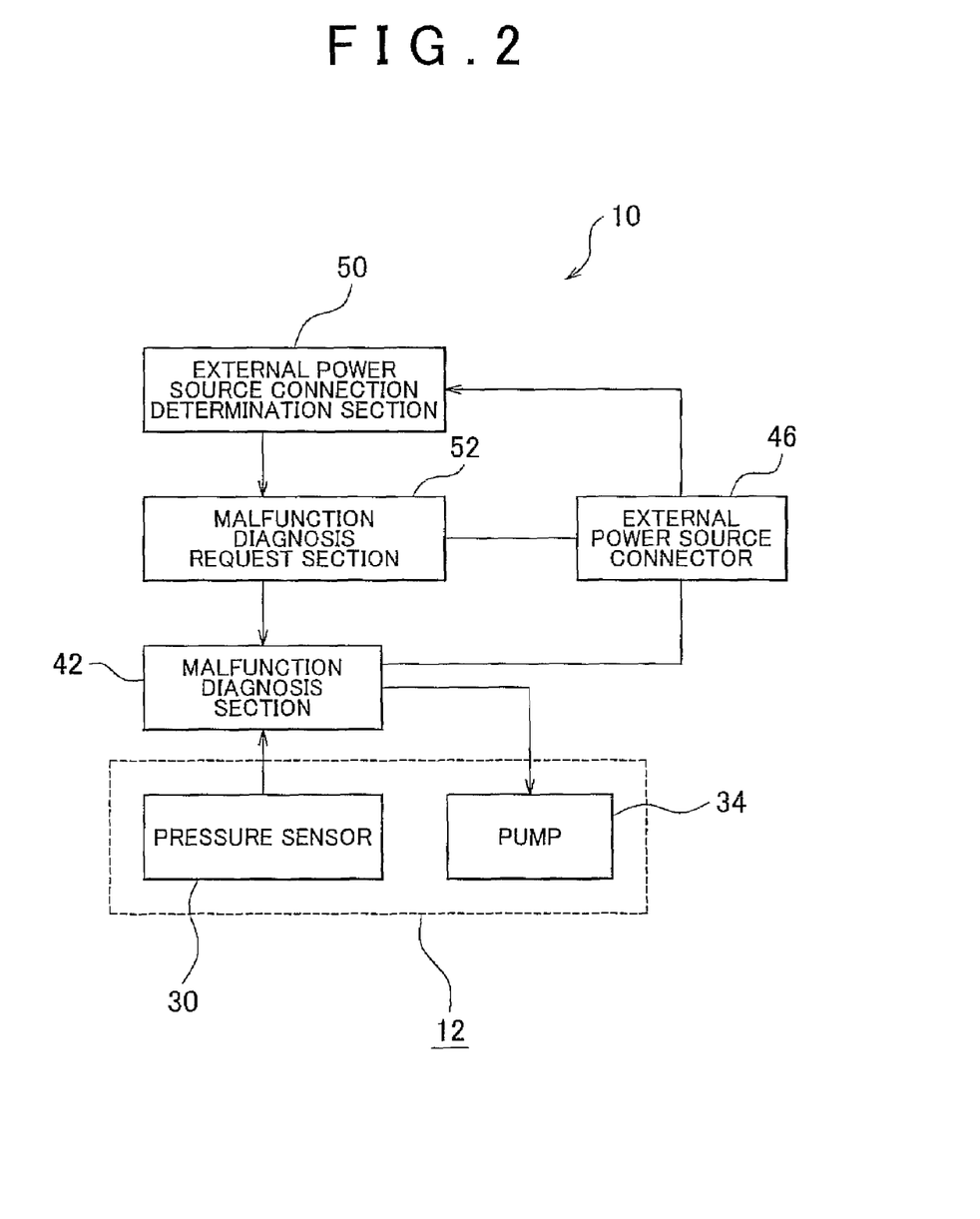
FIG. 2 is a block diagram that illustrates a basic configuration of the malfunction diagnosis system according to the embodiment of the present invention.
Figure 3:
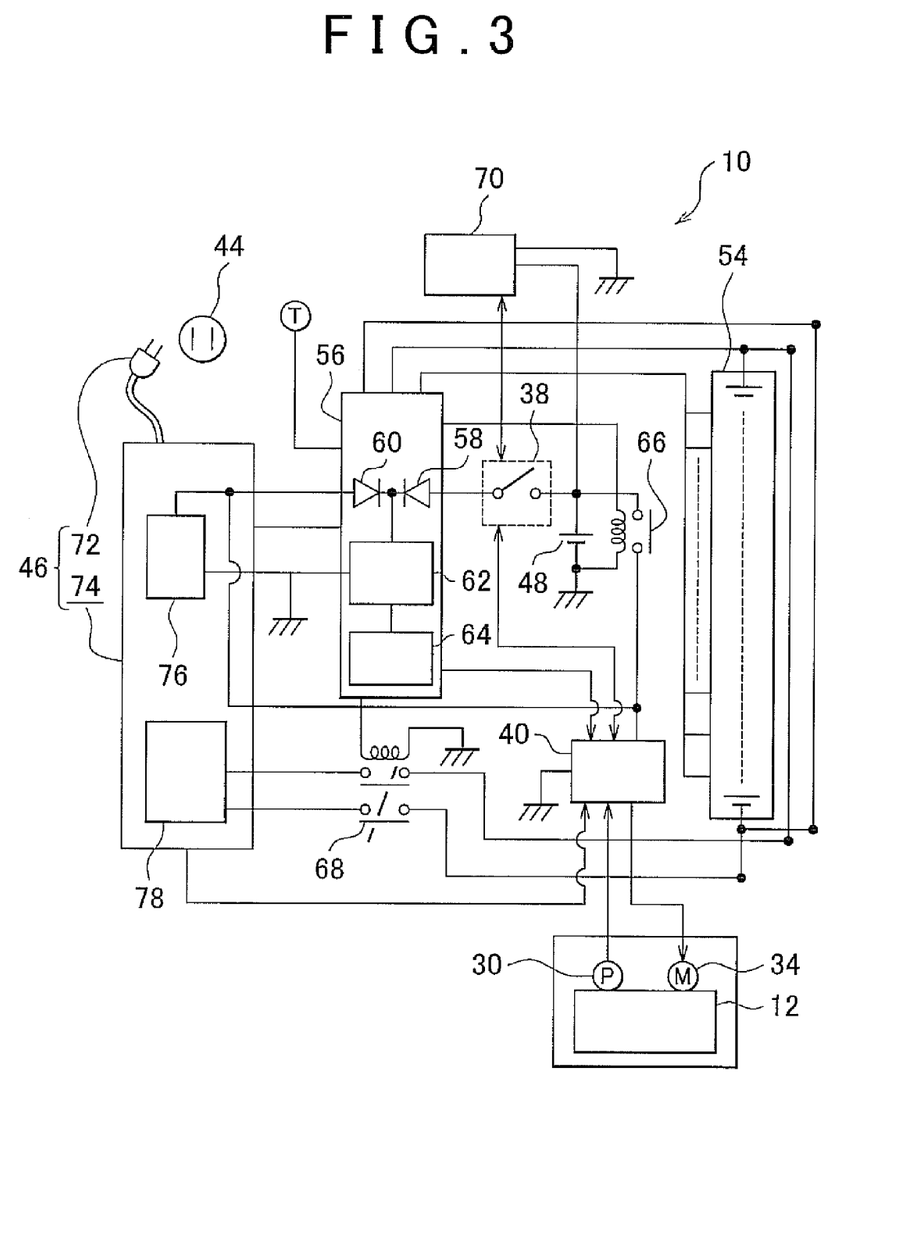
FIG. 3 is a block circuit diagram that illustrates the malfunction diagnosis system according the embodiment of the present invention in more detail than FIG. 2.
Figure 4:
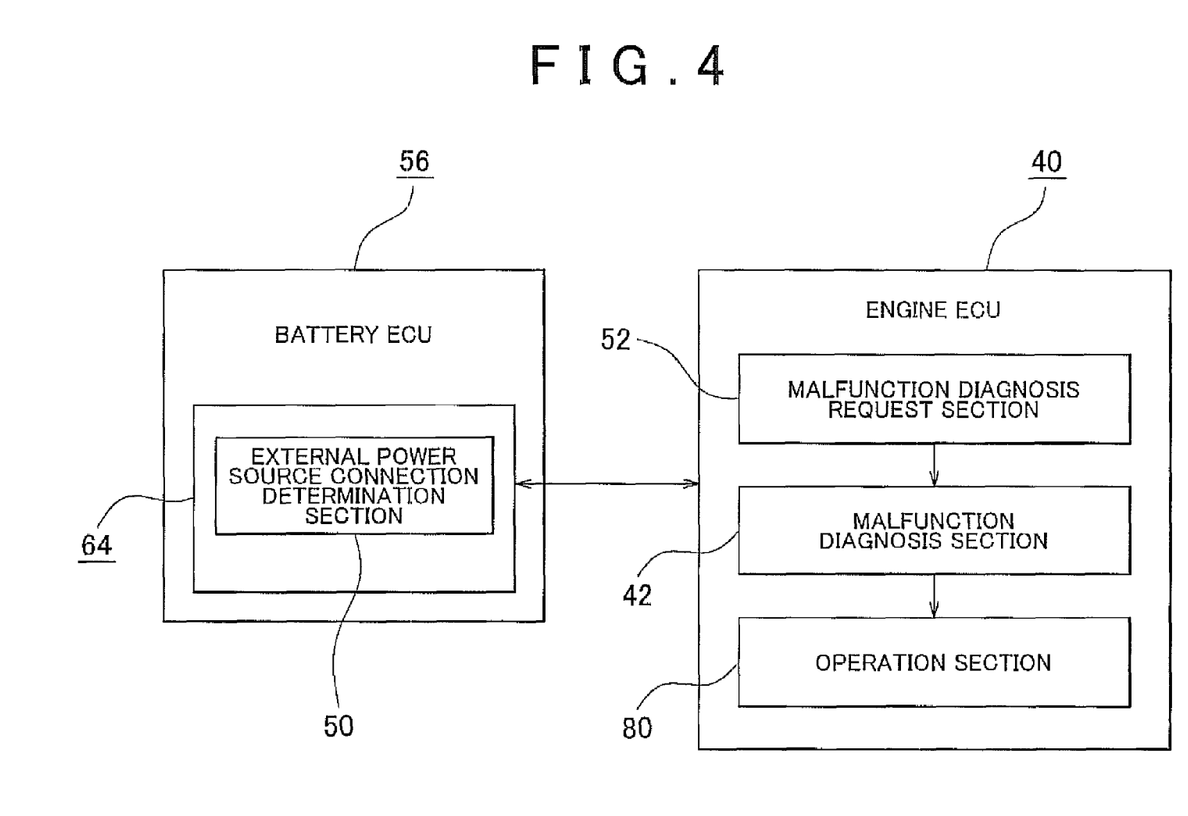
FIG. 4 is a configuration diagram that illustrates a battery ECU and an engine ECU taken out of FIG. 3 in more detail; and FIG. 5A
Figure 5A:
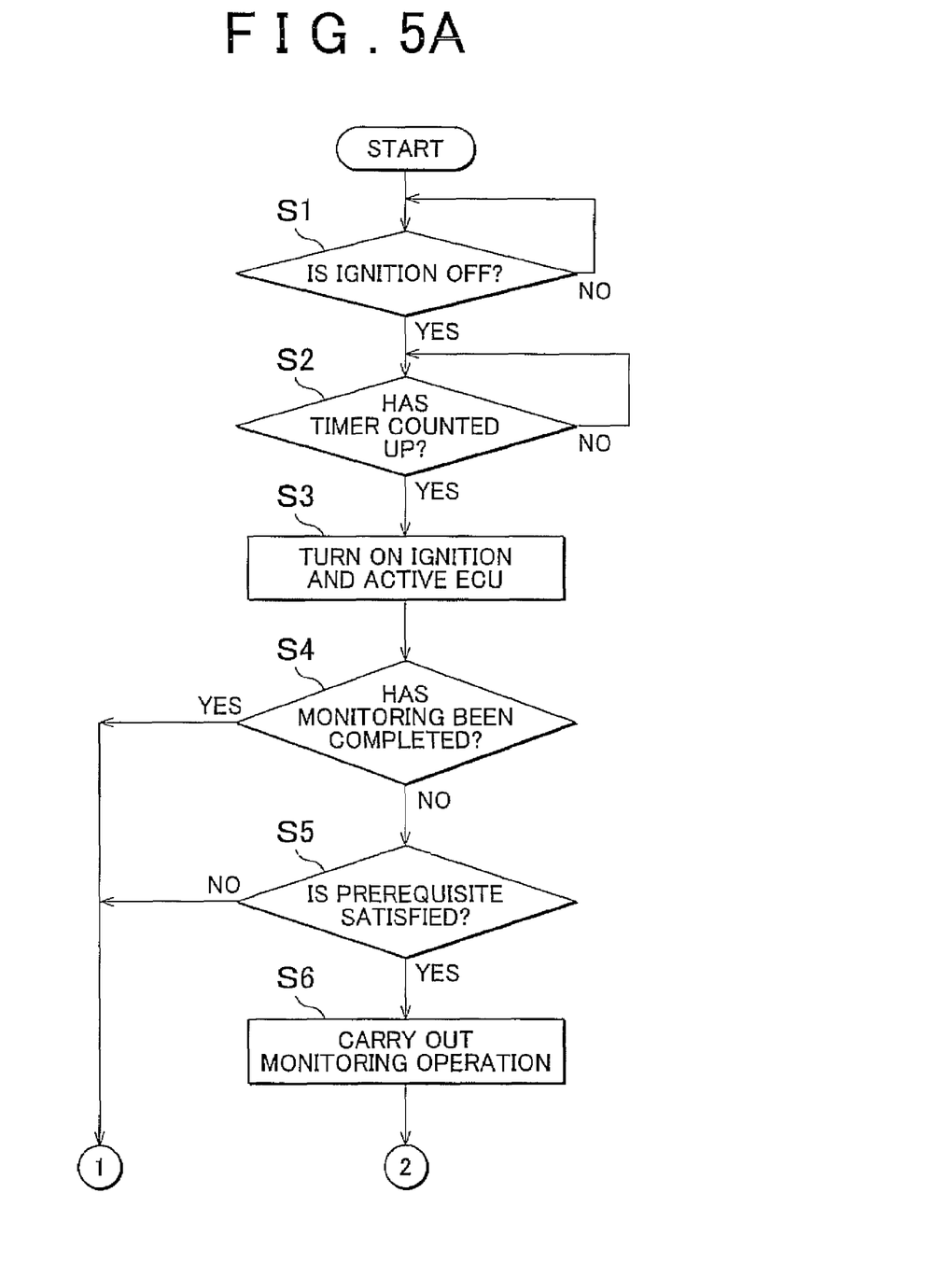
Figure 5B:
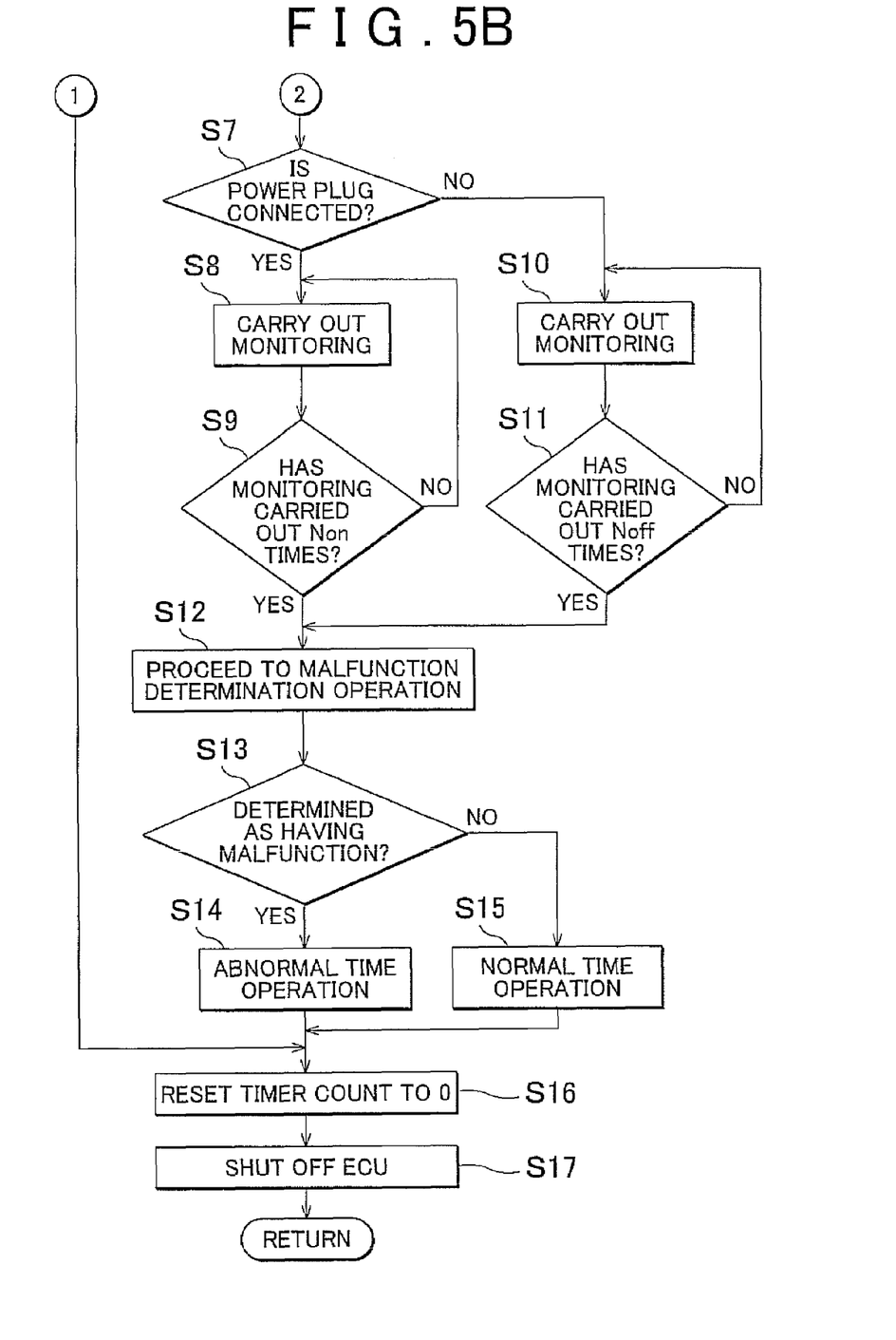
FIG. 5B is a flowchart that illustrates a malfunction diagnosis method for the electric vehicle on-board device according to the embodiment of the present invention.

An embodiment of the present invention will be described below in detail with reference to the drawings. FIG. 1 to FIG. 5B illustrate an example embodiment of the present invention. FIG. 1 is a schematic view of an evaporative emission control device for which a malfunction diagnosis system for an electric vehicle performs the malfunction diagnosis. FIG. 2 is a block diagram that illustrates a basic configuration of the malfunction diagnosis system of the embodiment. FIG. 3 is a block circuit diagram that illustrates the malfunction diagnosis system of this embodiment in more detail than FIG. 2. FIG. 4 is a configuration diagram that illustrates a battery ECU and an engine ECU taken out of FIG. 3 in more detail. FIG. 5A and FIG. 5B is a flowchart that illustrates a malfunction diagnosis method for the electric vehicle on-board device of the embodiment.

As shown in FIG. 1, the on-board device for which a malfunction diagnosis is performed by a malfunction diagnosis system 10, which is the malfunction diagnosis system for an electric vehicle on-board device according to this embodiment, is an evaporative emission control device 12 mounted on a hybrid vehicle 11 as an electric vehicle. The evaporative emission control device 12 is first described with reference to FIG. 1, and the malfunction diagnosis system 10 for the evaporative emission control device 12 and a malfunction diagnosis method therefor are next described. In the hybrid vehicle 11, the evaporative emission control device 12 prevents emission of fuel vapor as evaporation gas from a fuel tank 16 that stores a fuel such as gasoline to be supplied to an engine 14 into the atmosphere. For this purpose, the evaporative emission control device 12 has a canister 20 that is connected to the fuel tank 16 via an upstream exhaust pipe 18, a downstream exhaust pipe 24 that is connected between the canister 20 and an intake manifold 22, and a pump connection pipe 26 that is connected to the canister 20. The canister 20 contains an adsorbent 28, such as activated carbon, to adsorb the fuel vapor. A pressure sensor 30 that detects the fuel vapor pressure in the evaporative emission control device 12 or a condition of the evaporative emission control device 12, is provided upstream of the downstream exhaust pipe 24. A first electromagnetic shut-off valve 32 that opens and closes in response to input of a control signal is provided downstream of the downstream exhaust pipe 24. An electric pump 34 is provided upstream of the pump connection pipe 26, and a second electromagnetic shut-off valve 36 that opens and closes in response to input of a control signal is provided downstream of the pump connection pipe 26.

The evaporative emission control device 12 as described above allows the fuel vapor delivered from the fuel tank 16 into the canister 20 through the upstream exhaust pipe 18 to be adsorbed by the adsorbent 28 when the first shut-off valve 32 and the second shut-off valve 36 is closed. The fuel that is adsorbed in the adsorbent 28 is drawn into the intake manifold 22 through the downstream exhaust pipe 24 together with air by negative pressure in the intake manifold 22 and burned in the cylinders (not shown) of the engine 14 when the engine 14 is operating. The emission of fuel vapor into the atmosphere is therefore prevented.

In this embodiment, a diagnosis is performed to determine whether there a malfunction, such as a hole through which gas may leak, has occurred in any portion of the evaporative emission control device 12 as described above, including the upstream exhaust pipe 18 and the downstream exhaust pipe 24 after the hybrid vehicle 11 has been stopped and an ignition switch 38 (see FIG. 3) has been opened, that is, the ignition switch 38 has been turned off. The malfunction diagnosis system 10 is used to determine whether a malfunction has occurred in the evaporative emission control device 12. The malfunction diagnosis system 10 includes an engine ECU 40; a pressure sensor 30, which serves as an on-board device state detection section, that is provided in the downstream exhaust pipe 24; and an electric pump 34 that is provided in the pump connection pipe 26. The engine ECU 40 is a control section, and includes a microcomputer that has a CPU, a memory, and so on. The engine ECU 40 controls engine operating parameters such as fuel injection amount into the engine 14 and ignition timing.

The malfunction diagnosis system 10 outputs a control signal from a malfunction diagnosis section 42 to the first shut-off valve 32 to close the first shut-off valve 32 when the engine ECU 40 is activated. Then, the malfunction diagnosis system 10 outputs a control signal from the malfunction diagnosis section 42 to the second shut-off valve 36 to open the second shut-off valve 36 and causes another control signal from the malfunction diagnosis section 42 to activate the electric pump 34 so that a negative pressure is created in the constituent components of the evaporative emission control device 12 such as the upstream exhaust pipe 18, the downstream exhaust pipe 24, and the canister 20. The pressure sensor 30 outputs the detected pressure to the malfunction diagnosis section 42, and the malfunction diagnosis section 42 stops the electric pump 34 and, at the same time, closes the second shut-off valve 36 when the detected pressure reaches a specified negative pressure. The malfunction diagnosis section 42 detects subsequent changes in the pressure to determine whether there is any gas leakage, and determines that a malfunction has occurred in the evaporative emission control device 12 if there is gas leakage or that no malfunction diagnosis there is no gas leakage.

When the malfunction diagnosis system 10 has a commonly known configuration, an ignition switch is provided between the engine ECU 40 and a low-voltage secondary battery with a voltage of, for example, 12 V as an electric storage section so that electric power is supplied from the low-voltage secondary battery to the engine ECU 40 and the engine ECU 40 is activated when the ignition switch is closed, that is, the ignition switch is turned on. Also, after the vehicle is stopped, a timer control section controls the ignition switch so that the ignition switch is turned on a predetermined period of time after the ignition switch turned off (i.e., the ignition switch is opened). In such a commonly known configuration, the amount of charge in the secondary battery may excessively decrease, that is, the battery may die if the malfunction diagnosis is frequently carried out while the vehicle is not driven because a power generator that supplies the secondary battery with electric power is not driven and the secondary battery is not charged. The malfunction diagnosis system 10 of this embodiment prevents the battery from dying and improves the accuracy of the malfunction diagnosis.

That is, in this embodiment, the hybrid vehicle 11 equipped with the malfunction diagnosis system 10 is a plug-in hybrid. A basic configuration of this embodiment is next described with reference to FIG. 2. In the following description, elements which are the same as those illustrated in FIG. 1 are designated by the same reference numerals. As shown in HG 2, the malfunction diagnosis system 10 of this embodiment has a battery charger-external power source connector 46, which serves as an external power source connector that may be connected to a commercial power source 44 (see FIG. 3) as an external power source when the hybrid vehicle 11 (FIG. 1) is not being driven; a malfunction diagnosis section 42 that determines whether a malfunction has occurred in the evaporative emission control device 12 when is supplied with electric power from at least one of the commercial power source 44 or a low-voltage secondary battery 48 with a voltage of, for example, 12 V (see FIG. 3); an external power source connection determination section 50 that determines whether the battery charger-external power source connector 46 is connected to the commercial power source 44; and a malfunction diagnosis request section 52 that requests the malfunction diagnosis section 42 to carry out malfunction diagnosis. The malfunction diagnosis section 42 outputs a control signal to the electric pump 34, which controls the operating conditions thereof, and receives the pressure detected by the pressure sensor 30. The battery charger-external power source connector 46 is removably connectable to the commercial power source 44, and supplies the electric power that is supplied from the commercial power source 44 to the malfunction diagnosis section 42 and the malfunction diagnosis request section 52 when connected to the commercial power source 44.

The malfunction diagnosis request section 52 changes the number of times that the malfunction diagnosis request section 52 requests the malfunction diagnosis section 42 to carry out the malfunction diagnosis depending on whether the external power source connection determination section 50 has determined that the battery charger-external power source connector 46 is connected to the commercial power source 44. Specifically, the number of times Non that the malfunction diagnosis request section 52 requests the malfunction diagnosis section 42 to carry out the malfunction diagnosis when it is determined that the battery charger-external power source connector 46 is connected to the commercial power source 44 is greater than the number of times Noff that the malfunction diagnosis request section 52 requests the malfunction diagnosis section 42 to carry out the malfunction diagnosis when it is determined that the battery charger-external power source connector 46 is not connected to the commercial power source 44 (Non>Noff).

A specific configuration of the embodiment shown in FIG. 2 is described with reference to FIG. 3 and FIG. 4. As shown in FIG. 3, the malfunction diagnosis system 10 of this embodiment, which is mounted on the hybrid vehicle 11 (FIG. 1) that is an electric vehicle, has the evaporative emission control device 12 as an on-board device, a high-voltage secondary battery 54, a low-voltage secondary battery 48 with a voltage of, for example, 12 V as an electric storage section, and a battery ECU 56 as a battery control section. The high-voltage secondary battery 54 is a driving source for a traction motor (not shown) and may be a nickel hydrogen battery, lithium ion battery, or the like. The battery ECU 56 has two diodes 58 and 60, a power supply circuit 62, and a controller 64. The controller 64 is a control section, and includes a microcomputer having a CPU, a memory, and so on. The malfunction diagnosis system 10 has an ignition switch 38 that opens and closes the connection between the battery ECU 56 and the low-voltage secondary battery 48, and a first relay 66, which is controlled by the battery ECU 56 to open and close the connection between the positive electrode side of the low-voltage secondary battery 48 and a high-potential power source terminal of the engine ECU 40.

The low-voltage secondary battery 48 supplies the battery ECU and the engine ECU 40 with electric power when the ignition switch 38 is closed, that is, the ignition switch 38 is turned on. Specifically, when the ignition switch 38 is closed, electric power is supplied from the low-voltage secondary battery 48 to the controller 64 through the diode 58, one of the two diodes 58 and 60, and the power supply circuit 62, and the battery ECU 56 is activated. Upon activation of the battery ECU 56, the battery ECU 56 connects the first relay 66, so that electric power is supplied from the low-voltage secondary battery 48 to the engine ECU 40.

The malfunction diagnosis system 10 also has a battery charger-external power source connector 46, a second relay 68, and a timer control section 70 as a time measurement control section. The battery charger-external power source connector 46 has a connector 72, such as a plug, that is removably connectable to the commercial power source 44, and a battery charger 74. The battery charger 74 has a low-voltage output section 76 which converts the electric power from the commercial power source 44 to low-voltage (14 V, for example) DC electric power and supplies the electric power to the low-voltage secondary battery 48, and a high-voltage output section 78 which converts the electric power from the commercial power source 44 to high-voltage (290 V, for example) DC electric power and supplies the electric power to the high-voltage secondary battery 54. Each of the low-voltage output section 76 and the high-voltage output section 78 includes a DC/DC converter (not shown).

The second relay 68 is provided between the opposite ends of the high-voltage output section 78 and the opposite ends of the high-voltage secondary battery 54, and is controlled by the battery ECU 56. The opposite ends of the low-voltage output section 76 are connected to the grounding wire of the battery ECU 56 and the anode side of the diode 60, the other of the two diodes 58 and 60, respectively. Also, the high-potential output line of the low-voltage output section 76 is connected to the high-potential power supply terminal of the engine ECU 40. The controller 64 of the battery ECU 56 monitors the amounts of charge in the low-voltage secondary battery 48 and the high-voltage secondary battery 54, and opens and closes the first relay 66 and the second relay 68 depending on the amounts of charge. For example, the controller 64 connects or closes the first relay 66 to start charging of the low-voltage secondary battery 48 when the amount of charge in the low-voltage secondary battery 48 falls to or below a predetermined amount of charge, and disconnects or opens the first relay 66 to end charging of the low-voltage secondary battery 48 when the amount of charge in the low-voltage secondary battery 48 increases to or above another predetermined amount of charge.

Also, the controller 64 connects the second relay 68 to start charging the high-voltage secondary battery 54 when the amount of charge in the high-voltage secondary battery 54 falls to or below a predetermined amount of charge, and disconnects the second relay 68 to end charging of the high-voltage secondary battery 54 when the amount of charge in the high-voltage secondary battery 54 increases to or above another predetermined amount of charge.

The timer control section 70 controls the ignition switch 38 so that the ignition switch 38 is turned on a predetermined period of time after the ignition switch 38 has been opened (i.e., turned OFF). The timer control section 70 is supplied with electric power from the low-voltage secondary battery 48 even when the ignition switch 38 is turned off.

The battery charger 74 includes a battery charger ECU (not shown) that includes a microcomputer, and the battery charger ECU outputs a signal to control the ignition switch 38 so that the ignition switch 38 is turned ON when the connector 72 is connected to the commercial power source 44.

As shown in FIG. 4, the controller 64 of the battery ECU 56 has an external power source connection determination section 50. The engine ECU 40 has a malfunction diagnosis request section 52, a malfunction diagnosis section 42, and an operation section 80. In the following description, elements which are the same as those illustrated in FIG. 1 to FIG. 3 are designated by the same reference numerals. When the malfunction diagnosis section 42 is supplied with electric power from at least one of the low-voltage secondary battery 48 or the commercial power source 44, it determines whether a malfunction has occurred in the evaporative emission control device 12 using the electric pump 34 and the pressure sensor 30. That is, after the electric pump 34 is driven once and then stopped, the malfunction diagnosis section 42 monitors subsequent changes in the pressure detected by the pressure sensor 30. The malfunction diagnosis section 42 determines that a malfunction has not occurred in the evaporative emission control device 12 if the pressure detected by the pressure sensor 30 is within a predetermined pressure range after a predetermined period of time, but determined that a malfunction has occurred if the pressure detected by the pressure sensor 30 fall outside the predetermined pressure range. That is, the malfunction diagnosis section 42 yields a different diagnosis as to whether a malfunction has occurred in the evaporative emission control device 12 depending on the pressure detected by the pressure sensor 30. The malfunction diagnosis request section 52 requests the malfunction diagnosis section 42 to carry out the malfunction diagnosis. The engine ECU 40 including the malfunction diagnosis request section 52 and the malfunction diagnosis section 42 is supplied with low-voltage electric power that is supplied from the commercial power source 44 from the battery charger-external power source connector 46 when the battery charger-external power source connector 46 is connected to the commercial power source 44.

The external power source connection determination section 50 receives a signal indicating whether the battery charger-external power source connector 46 is connected to the commercial power source 44 from the battery charger-external power source connector 46, and determines, accordingly, whether the battery charger-external power source connector 46 is connected to the commercial power source 44. The external power source connection determination section 50 then outputs the result of the determination to the malfunction diagnosis request section 52. The malfunction diagnosis request section 52 changes the number of times that the malfunction diagnosis request section 52 requests the malfunction diagnosis section 42 to carry out malfunction diagnosis depending on whether the external power source connection determination section 50 has determined that the battery charger-external power source connector 46 is connected to the commercial power source 44. Specifically, the number of times Non that the malfunction diagnosis request section 52 requests the malfunction diagnosis section 42 to carry out the malfunction diagnosis when it is determined that the battery charger-external power source connector 46 is connected to the commercial power source 44 is greater than the number of times Noff that the malfunction diagnosis request section 52 requests the malfunction diagnosis section 42 to carry out the malfunction diagnosis when it is determined that the battery charger-external power source connector 46 is not connected to the commercial power source 44 (Non>Noff).

The malfunction diagnosis request section 52 requests the malfunction diagnosis section 42 to carry out the malfunction diagnosis after the ignition switch 38 is turned from off to on and the electric power is supplied from the low-voltage secondary battery 48. When the malfunction diagnosis section 42 has carried out the malfunction diagnosis the number Non or Noff of times, the malfunction diagnosis request section 52 controls the ignition switch 38 so that the ignition switch 38 is turned off, and outputs a request signal that resets the count to the timer control section 70.

The operation section 80 carries out an abnormal time operation if the number of times the malfunction diagnosis section 42 has determined that a malfunction has occurred in the evaporative emission control device 12 is equal to or above a predetermined value, and carries out a normal time operation if the number of times the malfunction diagnosis section 42 has determined that a malfunction has occurred in the evaporative emission control device 12 is below the predetermined value. The abnormal time operation is to turn on an alarm or warning light to warn those around the vehicle if the vehicle is not driven or to turn on an alarm or warning light to warn the driver when the driver turns the ignition key to the accessory position to restart the vehicle, for example. The abnormal time operation may include recording the identification code or the like of the part that has malfunctioned in a storage section so that a technician can read the code out during maintenance and repair work or the identification code can be displayed on a display section such as a display in the vehicle cabin, for example.

Referring again to FIG. 3, the charging operation that is carried out to charge the vehicle batteries from the external commercial power source 44 when the vehicle is not driven is next described. When the connector 72 is connected to the commercial power source 44, the battery charger ECU turns on the ignition switch 38 so that the battery ECU 56 is activated by electric power from the low-voltage secondary battery 48. Then, the battery ECU 56 connects the first relay 66 and the second relay 68, and requests the low-voltage output section 76 and the high-voltage output section 78 to deliver a low-voltage output and a high-voltage output, respectively. As a result, the high-voltage secondary battery 54 and the low-voltage secondary battery 48 are charged, and the engine ECU 40 is activated. This makes it possible for the malfunction diagnosis section 42 to carry out the malfunction diagnosis.

In contrast, when charging from the commercial power source 44 is not carried out while the vehicle is not driven, the timer control section 70 turns on the ignition switch 38 a predetermined period of time after it is turned off, so that the battery ECU 56 is activated by electric power from the low-voltage secondary battery 48. Also, the battery ECU 56 connects the first relay 66, so that the engine ECU 40 is supplied with electric power from the low-voltage secondary battery 48 and the engine ECU 40 is activated. This makes it possible for the malfunction diagnosis section 42 to carry out the malfunction diagnosis.

Referring now to FIG. 5A and FIG. 5B, the malfunction diagnosis method for an electric vehicle on-board device of this embodiment is next described. In the following description, elements which are the same as those illustrated in FIG. 1 to FIG. 4 are designated by the same reference numerals. In step S1, if the ignition switch 38 is off, the timer control section 70 starts timer counting or measurement of time and determines whether the timer has counted up a predetermined period of time, that is, a predetermined period of time has elapsed. If it is determined that the predetermined period of time has elapsed, the timer control section 70 turns on the ignition switch 38 to activate the battery ECU 56, which in turn connects the first relay 66 to activate the engine ECU 40 in step S2. Then, in step S4, the malfunction diagnosis request section 52 determines whether the malfunction diagnosis section 42 has carried out the malfunction diagnosis or has completed monitoring. If it is determined that the malfunction diagnosis section 42 has completed monitoring, the process proceeds to step S16, in which the count of the timer control section 70 is reset and the ignition switch 38 is turned off to shut down the battery ECU 56 and the engine ECU 40. Then, the process returns to step S1. If the count of the timer control section 70 is reset, the timer control section 70 restarts timer counting.

If it is determined that the malfunction diagnosis section 42 has not completed monitoring in step S4, the malfunction diagnosis request section 52 determines whether a monitoring condition is satisfied in step S5. The monitoring condition may be satisfied if, for example, the detected ambient temperature detected by a temperature sensor (not shown) is equal to or below a predetermined temperature, a predetermined period of time has elapsed after the ignition switch 38 has been turned off, the temperature of engine coolant that is detected by a coolant temperature sensor (not shown) is equal to or below a predetermined value, or the like, and is previously set. If the monitoring condition is not satisfied, the process proceeds to step S16 just as in the case where the answer is Yes in step S4.

If it is determined that the monitoring requirement is satisfied in step S5, the process proceeds to a monitoring operation as a malfunction diagnosis operation in step S6, and the external power source connection determination section 50 determines whether the commercial power source 44 is connected to the connector 72 and outputs the result of the determination to the malfunction diagnosis request section 52 in step S7. If it is determined that the commercial power source 44 is connected to the connector 72 in step S7, the malfunction diagnosis request section 52 requests the malfunction diagnosis section 42 to carry out monitoring the malfunction diagnosis a predetermined number Non of times, which has been previously set, and the failure diagnosis section 42 carries out failure diagnosis the number Non of times (S8, S9).

If it is determined that the commercial power source 44 is not connected to the connector 72 in step S7, the malfunction diagnosis request section 52 requests the malfunction diagnosis section 42 to carry out monitoring as malfunction diagnosis a predetermined number of times Noff, which is less than Non, and the failure diagnosis section 42 carries out failure diagnosis the number of times Noff (S10, S11).

Then, the process proceeds to a malfunction determination operation in step S12, and the malfunction diagnosis section 42 determines whether to output a signal indicating that a malfunction has occurred in the evaporative emission control device 12 in step S13. The malfunction diagnosis section 42 may determine that a malfunction has occurred in the evaporative emission control device 12 if it is has been diagnosed as having a malfunction at least a predetermined number of times in the number Non or Noff of rounds of malfunction diagnosis. The predetermined number of times may be at least once. The malfunction diagnosis section 42 may determine that the a malfunction has occurred in evaporative emission control device 12 if it is diagnosed as having a malfunction in all the number Non or Noff of rounds of malfunction diagnosis. The condition under which it is determined that a malfunction has occurred in the evaporative emission control device 12 is previously set.

If it is determined in step S13 that a malfunction has occurred in the evaporative emission control device 12, the malfunction diagnosis section 42 outputs a signal indicating the fact to the operation section 80, and the process proceeds to step S14, in which the operation section 80 carries out the above malfunction-time operation. However, if it is determined in step S13 that a malfunction has not occurred in the evaporative emission control device 12, that is, it is determined that the evaporative emission control device 12 is operating normally in step S13, the malfunction diagnosis section 42 outputs a signal indicating that the evaporative emission control device 12 is operating normally to the operation section 80, and the process proceeds to step S15, in which the operation section 80 carries out a usual normal time operation, which is carried out when the vehicle is not driven. The normal time operation includes turning off a warning light that is turned on, for example, during an malfunction-time operation. After steps S14 and S15, the process proceeds to step S16, in which the malfunction diagnosis request section 52 outputs a signal to the timer control section 70 to reset the timer count to 0. Then, the timer control section 70 resets the timer count, and starts timer counting again.

Then, the engine ECU 40 turns off the ignition switch 38 to shut off the activation of the battery ECU 56 and the engine ECU 40, and the process returns to step S1. Thus, even if the monitoring condition has not been satisfied in step S5, if the monitoring condition is satisfied when the timer count-up is completed again in step S2 after the activation of the battery ECU 56 and the engine ECU 40 have been shut off, the process proceeds to the monitoring operation in step S6. It is because the possibility of an abnormal time operation being carried out due to a false detection by the malfunction diagnosis section 42 can be reduced that the monitoring operation as a malfunction diagnosis operation and the malfunction determination operation are carried out separately as in this embodiment.

As described above, the malfunction diagnosis method for an electric vehicle on-board device of this embodiment includes an external power source connection determination process in which the external power source connection determination section 50 determines whether the battery charger-external power source connector 46 is connected to the commercial power source 44 (step S7 in FIG. 5B), and a malfunction diagnosis process in which the malfunction diagnosis request section 52 changes the number of times that the malfunction diagnosis request section 52 requests the malfunction diagnosis section 42 to carry out the malfunction diagnosis depending on the result of the determination made by the external power source connection determination section 50 regarding whether the battery charger-external power source connector 46 is connected to the commercial power source 44, and the malfunction diagnosis section 42 carry out diagnosis as to whether the evaporative emission control device 12 has a malfunction according to the request (steps S8 to S11 in FIG. 5B).

According to the malfunction diagnosis system 10 and malfunction diagnosis method of this embodiment, because the number of times Non that the malfunction diagnosis request section 52 requests the malfunction diagnosis section 42 to carry out the malfunction diagnosis when it is determined that the battery charger-external power source connector 46 is connected to the commercial power source 44 is greater than the number of times Noff that the malfunction diagnosis request section 52 requests the malfunction diagnosis section 42 to carry out the malfunction diagnosis when it is determined that the battery charger-external power source connector 46 is not connected to the commercial power source 44 (Non>Noff) as in this embodiment, the number of times of the malfunction diagnosis can be increased for a higher malfunction diagnosis accuracy when the battery charger-external power source connector 46 and the commercial power source 44 are connected. However, the number of times of malfunction diagnosis may be decreased to prevent the amount of charge in the low-voltage secondary battery 48, which supplies electric power to the malfunction diagnosis section 42, from decreasing excessively, that is prevent a dead battery when the battery charger-external power source connector 46 is not connected to the commercial power source 44. Therefore, it is possible to prevent the amount of charge in the low-voltage secondary battery 48 from decreasing excessively and improve the accuracy of the malfunction diagnosis on the evaporative emission control device 12.

Also, the timer control section 70, which controls the ignition switch 38 so that the ignition switch 38 is turned on a predetermined period of time after the ignition switch 38 is turned off, is provided, and the malfunction diagnosis request section 52 controls the ignition switch 38 so that the ignition switch 38 is turned off when the malfunction diagnosis section 42 completed the malfunction diagnosis. Thus, it is possible to increase the accuracy of the malfunction diagnosis on the evaporative emission control device 12, and to prevent the battery ECU 56 and the engine ECU 40, which includes the external power source connection determination section 50, the malfunction diagnosis request section 52 and the malfunction diagnosis section 42, from being supplied with electric power from the low-voltage secondary battery 48 for excessively long periods of time and therefore prevent the amount of charge in the low-voltage secondary battery 48 from decreasing excessively while the hybrid vehicle 11 is not driven.

In this embodiment, the malfunction diagnosis request section 52 changes the number of times it requests the malfunction diagnosis section 42 to carry out malfunction diagnosis in accordance with the result of the determination made by the external power source connection determination section 50 regarding the connection state between the battery charger-external power source connector 46 and the commercial power source 44. That is, the number of times Non that the malfunction diagnosis request section 52 requests the malfunction diagnosis section 42 to carry out the malfunction diagnosis when it is determined that the battery charger-external power source connector 46 is connected to the commercial power source 44 is greater than the number of times Noff that the malfunction diagnosis request section 52 requests the malfunction diagnosis section 42 to carry out malfunction diagnosis when it is determined that the battery charger-external power source connector 46 is not connected to the commercial power source 44 (Non>Noff). The malfunction diagnosis request section 52 changes the period of time for which the malfunction diagnosis request section 52 requests the malfunction diagnosis section 42 to carry out malfunction diagnosis depending on whether the external power source connection determination section 50 has determined that the battery charger-external power source connector 46 is connected to the commercial power source 44. That is, the period of time Ton for which the malfunction diagnosis request section 52 requests the malfunction diagnosis section 42 to carry out malfunction diagnosis when it is determined that the battery charger-external power source connector 46 is connected to the commercial power source 44 may be longer than the period of time Toff for which the malfunction diagnosis request section 52 requests the malfunction diagnosis section 42 to carry out malfunction diagnosis when it is determined that the battery charger-external power source connector 46 is not connected to the commercial power source 44 (Ton>Toff). In this case, if it is determined that the commercial power source 44 is connected to the connector 72 in step S7 in FIG. 5B, the malfunction diagnosis request section 52 requests the malfunction diagnosis section 42 to repeatedly carry out monitoring as malfunction diagnosis for a predetermined period of time Ton, and the malfunction diagnosis section 42 repeatedly carries out the malfunction diagnosis during the period of time Ton. When one round of the malfunction diagnosis takes a finite period of time, a plurality of rounds of malfunction diagnosis are carried out as long as the finite period of time is shorter than the time period Ton, and the malfunction diagnosis section 42 repeats malfunction diagnosis until the total malfunction diagnosis time reaches the period of time Ton. Also, if it is determined that the commercial power source 44 is not connected to the connector 72 in step S7, the malfunction diagnosis request section 52 requests the malfunction diagnosis section 42 to continue monitoring as malfunction diagnosis for a predetermined period of time Toff, and the failure diagnosis section 42 repeatedly carries out failure diagnosis for the period of time Toff.

In this embodiment, the on-board device for which the malfunction diagnosis is performed is the evaporative emission control device 12. However, the present invention is not limited to the above case, and the on-board device for which malfunction diagnosis is performed may be an engine coolant cooling system or a battery control device that controls batteries such as secondary batteries and manages charging and discharging of the secondary batteries. For example, when the malfunction diagnosis is performed on the cooling system, the malfunction diagnosis section 42 of the engine ECU 40 receives the engine coolant temperature detected by a coolant temperature sensor after a predetermined period of time has elapsed after the vehicle is stopped, and determines that a malfunction has occurred in the cooling system if the detection coolant temperature is abnormally high, such as 80° C. The present invention may be used to diagnose a malfunction of such an on-board device.

Also, the malfunction diagnosis section 42 and the malfunction diagnosis request section 52 may be implemented in a control section other than the engine ECU 40. Similarly, the external power source connection determination section may be implemented in a control section other than the battery ECU 56. Also, the malfunction diagnosis section 42, the malfunction diagnosis request section 52, and the external power source connection determination section 50 may be implemented in a single control section.

While the invention has been described with reference to example embodiments thereof, it should be understood that the invention is not limited to the example embodiments or constructions. To the contrary, the invention is intended to cover various modifications and equivalent arrangements. In addition, while the various elements of the example embodiments are shown in various combinations and configurations, which are exemplary, other combinations and configurations, including more, less or only a single element, are also within the spirit and scope of the invention.

What is claimed is:

1. A malfunction diagnosis system for an electric vehicle on-board device, which includes an electric vehicle on-board device provided in an electric vehicle, the malfunction diagnosis system comprising:

a malfunction diagnosis section that performs diagnosis to determine whether a malfunction has occurred in the electric vehicle on-board device when the malfunction diagnosis section is supplied with electric power from at least one of an electric storage section and an external power source;

a malfunction diagnosis request section that requests the malfunction diagnosis section to carry out malfunction diagnosis;

an external power source connecting section that supplies electric power from the external power source to the malfunction diagnosis section and the malfunction diagnosis request section when the external power source connecting section is connected to the external power source, wherein the external power source is connected to and disconnected from the external power source connecting section; and an external power source connection determination section that determines whether the external power source connecting section is connected to the external power source;

wherein the malfunction diagnosis request section changes the number of times that the malfunction diagnosis section carries out malfunction diagnosis according to a request from the malfunction diagnosis request section or a period of time for which the malfunction diagnosis section carries out malfunction diagnosis according to the request from the malfunction diagnosis request section, depending on whether the external power source connection determination section had determined that the external power source connecting section is connected to the external power source; and the number of times that the malfunction diagnosis section carries out malfunction diagnosis according to the request from the malfunction diagnosis request section or the period of time for which the malfunction diagnosis section carries out malfunction diagnosis according to the request from the malfunction diagnosis request section when it is determined that the external power source connecting section is connected to the external power source is greater than the number of times that the malfunction diagnosis section carries out malfunction diagnosis according to the request from the malfunction diagnosis request section or the period of time for which the malfunction diagnosis section carries out malfunction diagnosis according to the request from the malfunction diagnosis request section when it is determined that the external power source connecting section is not connected to the external power source.

2. The malfunction diagnosis system for an electric vehicle on-board device according to claim 1, further comprising:
   a low-voltage secondary battery that is the electric storage section that supplies electric power to the malfunction diagnosis section, the malfunction diagnosis request section, and the external power source connection determination section;
   a battery control section that includes the external power source connection determination section and is supplied with electric power from the low-voltage secondary battery;
   an ignition switch that opens and closes connection between the battery control section and the low-voltage secondary battery; and
   a relay that is controlled by the battery control section to open and close connection of the low-voltage secondary battery with the malfunction diagnosis request section and the malfunction diagnosis section;
   wherein the malfunction diagnosis request section requests the malfunction diagnosis section to carry out malfunction diagnosis after the ignition switch has changed from an open state to a closed state and electric power is supplied from the low-voltage secondary battery.

3. The malfunction diagnosis system for an electric vehicle on-board device according to claim 2, further comprising a time measurement control section that controls the ignition switch so that the ignition switch is closed after a lapse of a predetermined period of time after the ignition switch is opened,
   wherein the malfunction diagnosis request section controls the ignition switch so that the ignition switch is opened when the malfunction diagnosis section completes the malfunction diagnosis.

4. The malfunction diagnosis system for an electric vehicle on-board device according to claim 1, wherein the malfunction diagnosis section receives a detection signal from an on-board device state detection section that detects a state of the electric vehicle on-board device, and determines whether a malfunction has occurred in the electric vehicle on-board device based on a detection result that is indicated by the detection signal.

5. The malfunction diagnosis system for an electric vehicle on-board device according to claim 1, further comprising an operation section that carries out an abnormal time operation if the number of times that the malfunction diagnosis section has determined that a malfunction has occurred in the electric vehicle on-board device is greater than a predetermined value.

6. A malfunction diagnosis method for an electric vehicle on-board device, which is used to perform diagnosis to determine whether a malfunction has occurred in an electric vehicle on-board device provided in an electric vehicle using the malfunction diagnosis system for an electric vehicle on-board device according to claim 1, the method comprising:
   an external power source connection determination process in which the external power source connection determination section determines whether the external power source connecting section is connected to the external power source; and
   a malfunction diagnosis process in which the malfunction diagnosis request section changes the number of times that the malfunction diagnosis section carries out malfunction diagnosis according to the request from the malfunction diagnosis request section or a period of time for which the malfunction diagnosis section carries out malfunction diagnosis according to the request from the malfunction diagnosis request section, depending on whether the external power source connection determination section determines that the external power source connecting section is connected to the external power source, and the malfunction diagnosis section carries out diagnosis to determine whether the a malfunction has occurred in the electric vehicle on-board device according to the request, wherein
   in the malfunction diagnosis process, the number of times that the malfunction diagnosis section carries out malfunction diagnosis according to the request from the malfunction diagnosis request section or the period of time for which the malfunction diagnosis section carries out malfunction diagnosis according to the request from the malfunction diagnosis request section when it is determined that the external power source connecting section is connected to the external power source is greater than the number of times that the malfunction diagnosis section carries out malfunction diagnosis according to the request from the malfunction diagnosis request section or the period of time for which the malfunction diagnosis section carries out malfunction diagnosis according to the request from the malfunction diagnosis request section when it is determined that the external power source connecting section is not connected to the external power source.

* * * * *

UNITED STATES PATENT AND TRADEMARK OFFICE
CERTIFICATE OF CORRECTION

PATENT NO. : 8,165,739 B2
APPLICATION NO. : 12/476412
DATED : April 24, 2012
INVENTOR(S) : Takuya Matsumoto It is certified that error appears in the above-identified patent and that said Letters Patent is hereby corrected as shown below:

In the Specifications:
At column 4, line number 32, delete "is", insert --are--.
At column 4, line number 32, delete "illustrates", insert --illustrate--.
At column 4, line number 32, delete "flowchart", insert --flowcharts--.
At column 4, line number 50, delete "is", insert --are--.
At column 4, line number 50, delete "flowchart", insert --flowcharts--.
At column 4, line number 50, delete "illustrates", insert --illustrate--.
At column 5, line number 30, delete "there".
At column 6, line number 2, delete "diagnosis", insert --if--.
At column 6, line number 14, after switch, insert --is--.
At column 7, line number 56, delete "DC/DC", insert --AC/DC--.
At column 11, line number 4, delete "as", insert --the--.
At column 11, line number 14, delete "is".
At column 11, line number 19, delete "the".
At column 11, line number 21, after Noff, delete "of".
At column 11, line number 41, after during, delete "an".
At column 12, line number 9, delete "carry", insert --carries--.
At column 12, line number 33, delete "is prevent", insert --prevents--.
At column 12, line number 46, delete "completed", insert --completes--.

In the claims:
At column 16, claim 6, line number 26, delete "the".
At column 16, claim 6, line number 29, delete "wherein".
At column 16, claim 6, line number 30, delete "in", insert --wherein--.

Signed and Sealed this
Second Day of October, 2012

David J. Kappos
*Director of the United States Patent and Trademark Office*